United States Patent [19]

Lundblad

[11] Patent Number: 4,595,828

[45] Date of Patent: Jun. 17, 1986

[54] WALL-MOUNTED APPARATUS FOR DISPENSING AND/OR DEPOSITING VALUABLE PAPERS

[76] Inventor: Leif Lundblad, Häradsvägen 102, S-141 41 Huddinge, Sweden

[21] Appl. No.: 556,236

[22] PCT Filed: Mar. 17, 1983

[86] PCT No.: PCT/SE83/00094

§ 371 Date: Oct. 25, 1983

§ 102(e) Date: Oct. 25, 1983

[87] PCT Pub. No.: WO83/03317

PCT Pub. Date: Sep. 29, 1983

[30] Foreign Application Priority Data

Mar. 17, 1982 [SE] Sweden ................................ 8201781

[51] Int. Cl.[4] ................................................ G06F 15/30

[52] U.S. Cl. ...................................................... 235/379

[58] Field of Search ................................ 235/381, 379

[56] References Cited

U.S. PATENT DOCUMENTS 4,253,016 2/1981 Hirose ................................ 235/381

4,381,445 4/1983 Jenkins ................................ 235/379

*Primary Examiner*—Harold I. Pitts

*Attorney, Agent, or Firm*—Sughrue, Mion, Zinn, Macpeak and Seas

[57] ABSTRACT

An apparatus for dispensing and/or feeding banknotes comprises two part cabinets each placed on a respective side of a wall. Arranged between the part cabinets is a part of a transport device whose cross-sectional area is substantially smaller than that of either part cabinet as seen perpendicularly to the longitudinal direction of the transport device through the wall. In the longitudinal direction of the transport device, the extension of one part cabinet is substantially smaller than the extension of the other part cabinet. To enable the one part cabinet to be mounted to the wall, a plate is provided whose cross-sectional area is of the same magnitude as that of the part cabinet. The one part cabinet has a large, rectangular opening, which is closed by a sheet of transparent material, and a small slot-like opening. The part of the transport device is arranged telescopically, so that it can be adjusted to the thickness of the wall.

6 Claims, 8 Drawing Figures

Fig. 3
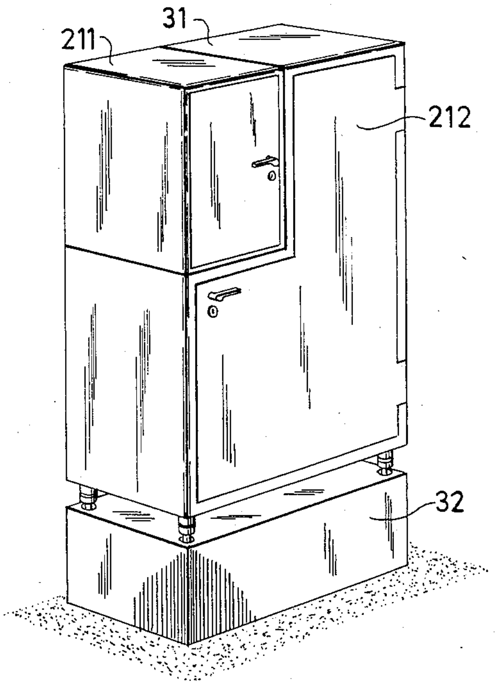
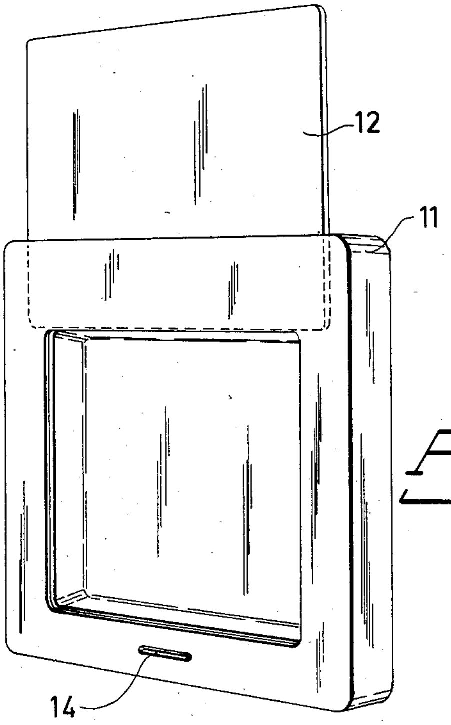
Fig. 7
Fig. 8
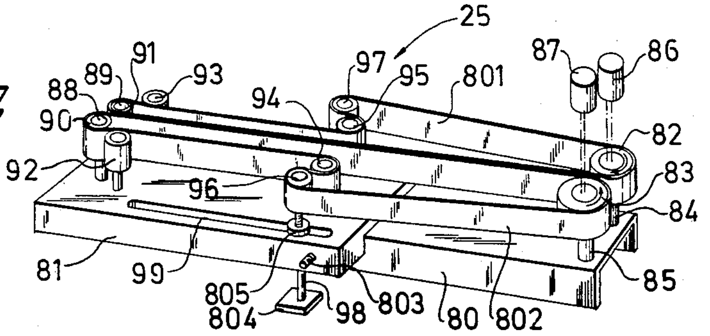

WALL-MOUNTED APPARATUS FOR DISPENSING AND/OR DEPOSITING VALUABLE PAPERS

TECHNICAL FIELD

The present invention relates to a wall-mounted apparatus for dispensing valuable papers, such as banknotes, cheques etc., from a store to a customer receipt opening and/or for depositing such valuable papers in a safety-deposit chamber in said apparatus.

The apparatus comprises a cabinet for housing such apparatus components as said store and/or said safety-deposit chamber, a transport means for transporting valuable papers from the store to the customer receipt opening and/or for feeding such valuable papers to the safety-deposit chamber, at least one keyboard, an electronic unit for controlling the dispensing operation, and an energy supply unit for supplying energy to the electronic unit, transport means etc.

BACKGROUND ART

Apparatus of the aforementioned kind are previously known, for example in the form of banknote dispensing apparatus, so-called autobanks. Such unmanned apparatus enable customers to withdraw cash from outside the bank, for example at times when the banks are normally closed or when there are long queues at the counters. The installation of such cash dispensers in existing bank buildings required complicated and expensive work to be carried out on the walls of said buildings. The object of the present invention is to eliminate this disadvantage and to not only simplify the installation work and to reduce the amount of time required for such work, but also to render the apparatus more secure against robbery.

DESCRIPTION OF THE INVENTION

In accordance with the invention the cabinet housing of an apparatus of the aforementioned kind is divided into two part cabinets, each of which is intended to be placed on a respective side of a wall. Arranged between the part cabinets is a part of a transport means which is intended to be placed in the wall and the cross-sectional area of which is substantially smaller than the cross-sectional area of at least the one part cabinet, as seen perpendicularly to the longitudinal direction of the transport means through the wall.

According to a further development of the invention, the extension of the one part cabinet is much smaller than the extension of the other part cabinet, when seen in the longitudinal direction of the transport means. The said one part cabinet houses the keyboard (optionally several keyboards), the customer receipt opening and a card reader, while the other part cabinet houses a security safe with stores of banknotes, optionally of various denominations.

These and other characterizing features of the invention are disclosed in the following claims.

DESCRIPTION OF THE DRAWINGS

The invention will now be described more clearly with reference to the accompanying drawings, in which FIG. 3 illustrates the second part cabinet and a base, FIG. 7 illustrates a modified embodiment of the one part cabinet, and FIG. 8 illustrates an embodiment of a transport means having a length which in accordance with the invention has been adjusted to the distance between the two part cabinets.

PREFERRED EMBODIMENT OF THE INVENTION

Figure 1:
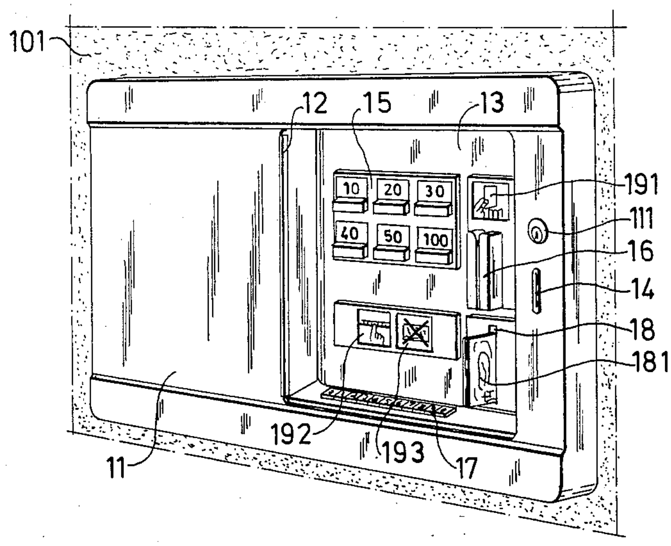
FIG. 1 is a front view of one part cabinet.

FIG. 1 is a front view of part of an apparatus for dispensing valuable papers, such as banknotes for example. This illustrated part of the apparatus is housed in a part cabinet 11, which is mounted on a wall 101, for example a wall in a bank. The part cabinet has a relatively large, rectangular opening 13, which can be closed by means of a movably arranged sheet 12 of transparent material. In FIG. 1, the sheet is shown displaced to the left, into the part cabinet, so that only the right hand edge of the sheet is visible. Arranged in the opening 13 is a first keyboard 15 having six buttons, numbered 10, 20, 30, 40, 50 and 100, a card reader 16, a second keyboard 17 with eleven buttons, numbered 0, 1, 2 . . . 9, C, and a customer receipt opening 18. In addition, there is provided a display window which is arranged to light up in an ordered sequence, to inform a customer how the apparatus shall be used, namely a window 191, which shows a hand which draws a card, a window 192, which illustrates how the keyboard is operated, and a window 193, which illustrates a crossed bundle of banknotes.

Adjacent the large opening 13 is a small, slot-like opening 14, in which a bankers card can be inserted, and a lock 111.

A customer who wishes to withdraw money, approaches the wall in which the apparatus is mounted and will find that the part cabinet 11 is fully closed by means of the sheet 12, which has thus been displaced out of the cabinet, parallel to the plane of the wall 101. A suitable information is given on the transparent sheet, indicating that the apparatus is free for a withdrawal to be made. The customer inserts his or her bankers card into the opening 14 (some mm), and if the card is of the correct kind moves the transparent sheet to the left, to the position shown in FIG. 1.

If the customer wishes to withdraw, for example, 500 Swedish Crs, he presses the first button (numbered 10) on the keyboard 15, whereupon the apparatus is prepared to dispense 10 times 50-Crs-notes. The window 191 now lights up, instructing the customer to draw the bankers card through the card reader 16, whereupon the window 192 lights up, instructing the customer to enter his or her individual code on the keyboard 17 located at the bottom of the apparatus. A bundle of banknotes 181 containing 10 50-Crs-notes and a receipt receipting the withdrawal will appear in the customer receipt opening 18 almost immediately as soon as the last number in the code is entered. The customer withdraws the bundle of banknotes, and the withdrawal procedure is therewith terminated and the transparent sheet 12 automatically moved to the right, to cover the whole of the opening 13.

Figure 2:
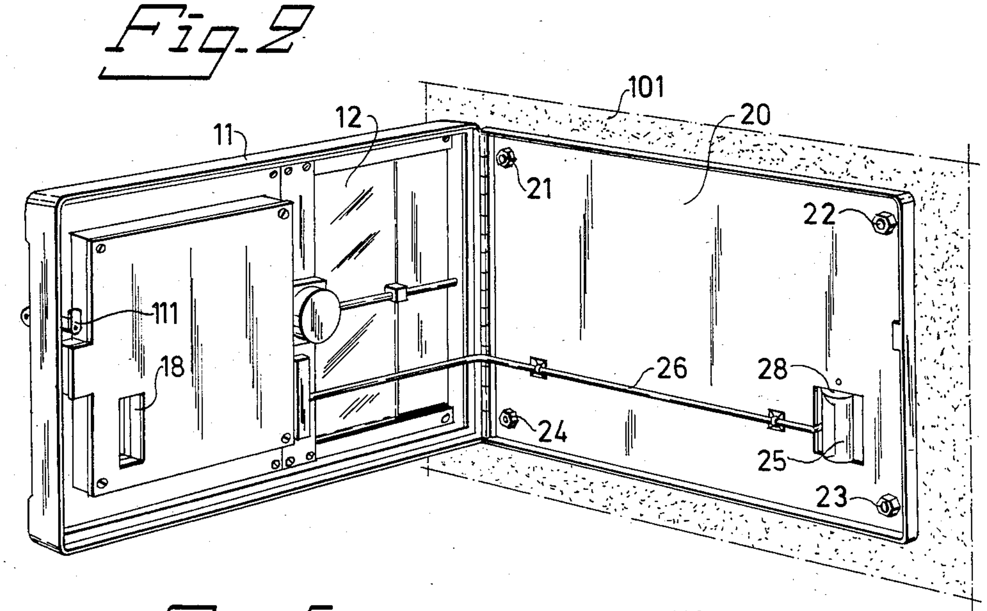
FIG. 2 illustrates said one part cabinet and a mounting plate.

As illustrated in FIG. 2, the part cabinet 11 is pivotally attached to a plate 20, which in turn is mounted to the wall 101 by means of four expander bolts 21–24. Arranged to the right of the plate is a hole 28 into which one end of a banknote transport means 25 protrudes, so that said one end lies opposite the opening 18 when the part cabinet 11 is swung into abutment with the whole of the periphery of the plate 20. An electrical cable 26 for supplying power to keyboards, lights etc., and for producing signals is also drawn through the hole 28.

FIG. 3 illustrates the remaining part of the banknote dispensing apparatus, this remaining part being housed in a part cabinet 31. This part cabinet rests on a base 32 located within the bank locale, adjacent the wall on whose outside the previously described part cabinet 11 is mounted. The part cabinet 31 comprises two lockable cupboards, a smaller cupboard 311 and a larger cupboard 312, each having a respective door.

Figure 4:
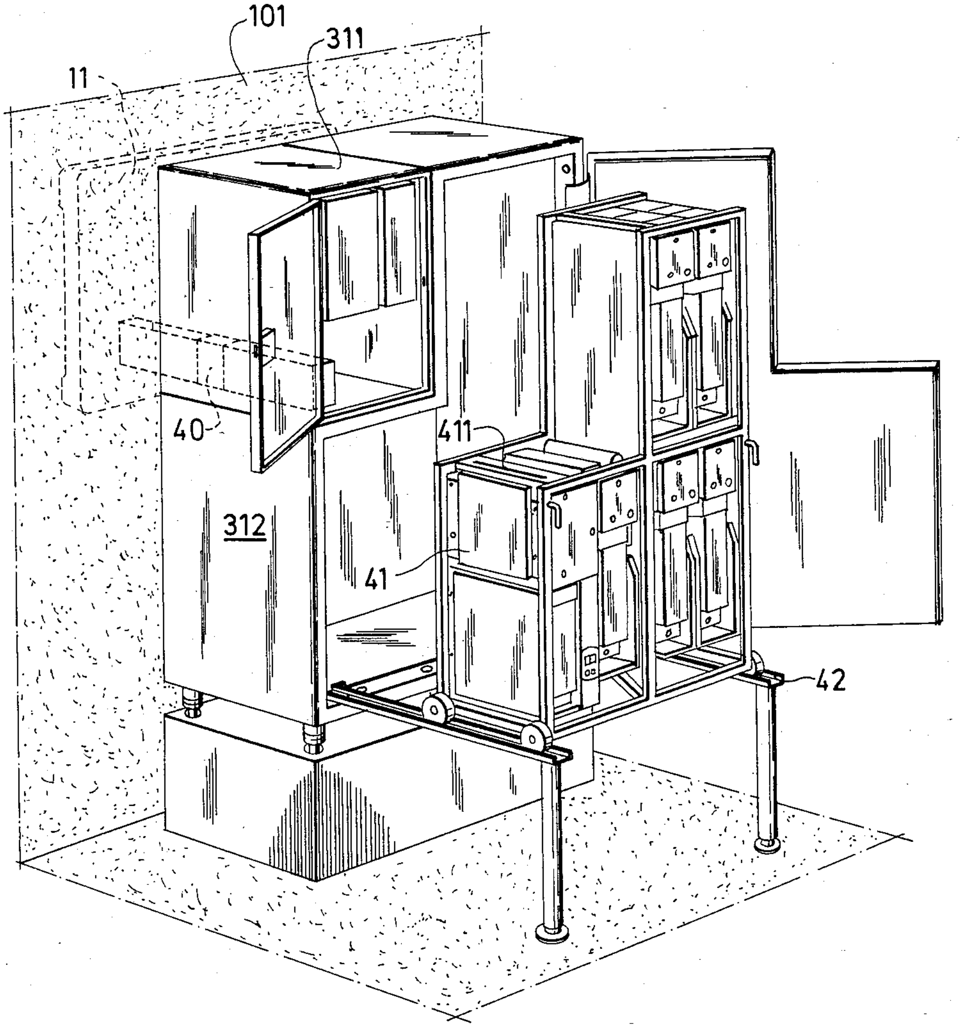
FIG. 4 is a rear view of the other part cabinet, with said store etc., withdrawn from the cabinet.

FIG. 4 also illustrates the part cabinet 31, although in this figure the doors of the two cupboards 311 and 312 are open and the contents of the cupboard 312 pulled out. Shown in the background in chain lines is the part cabinet 11, while the wall 101 which separates the two part cabinets from each other is indicated by shading.

As shown in the figure, extending between the two part cabinets is a tube 40, which is placed in the wall 101 and which discharges at one end into the hole 28 in the part cabinet 11 and which at its other end discharges into an opening in the cupboard 312, so that said opening lies opposite to an outfeed opening 411 of the banknote store 41. The tube 40 contains the transport means (rollers, belts etc.) required for transporting banknotes from the store in the part cabinet 31 to the customer receipt opening 18 in the part cabinet 11.

FIG. 4 illustrates the apparatus in its service state. When it is ready for use, the store 41 and remaining components are pushed into the part cabinet 31, the frame 42 on which the store etc. rests is lifted up and moved into the part cabinet 31, and the doors to the cupboards are closed and locked.

As will be seen from the figure, the extension of the part cabinet 11 (about 7 cm) is much smaller than the extension of the part cabinet 31, when seen in the longitudinal direction of the tube 40 or the transport means 25 respectively. It will also be seen from the figure, that the cross-sectional area of the tube 40, when seen perpendicularly to its longitudinal direction, has a much smaller area than the cross-sectional area of each of the part cabinets.

By way of example, it can be mentioned that the cross-sectional area of the tube 40 is 2 $dm^2$, while the area of the part cabinets is 80 $dm^2$ and 180 $dm^2$ respectively.

Figure 5:
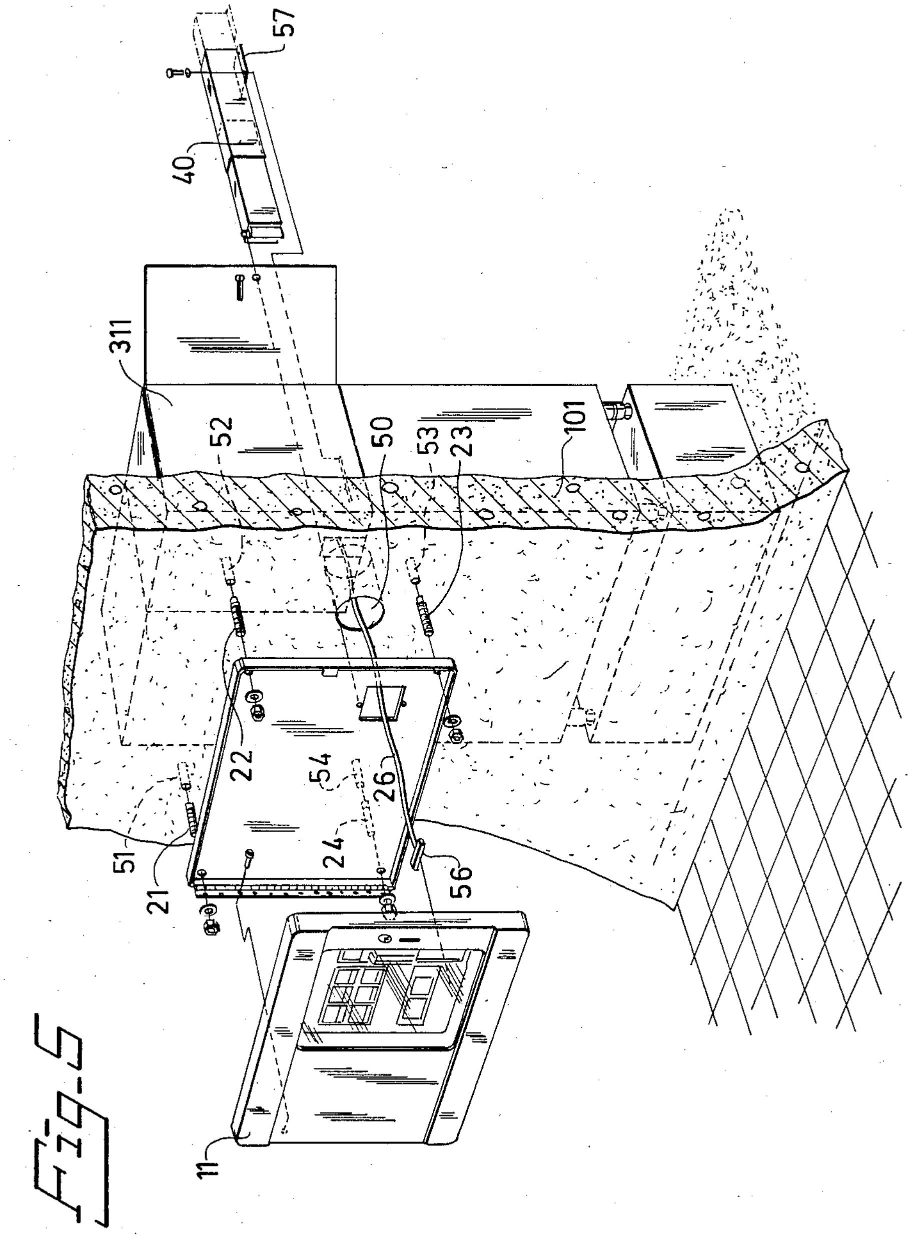
FIG. 5 is an exploded view of the two part cabinets, the mounting plate and a part of a wall.

The exploded view of FIG. 5 shows how an apparatus according to the invention is mounted and assembled. First there is formed a hole 50 in the wall on which one part cabinet is to be mounted, suitably by using a circular tube fitted with a diamond cutting bit in the active end of the tube wall. This tubular drill can be mounted in a frame, which is temporarily fixed in holes 51–54, said holes being later used for the previously mentioned expander bolts 21–24. The plate 20 is then secured to the wall by means of the expander bolts 21–24, and the part cabinet 11 is hooked onto the left side edge of the plate. The cable 26 is drawn through the hole 50 and connected to a connecting terminal 56 in an electronic unit in the part cabinet 11. The telescopic tube 40, incorporating the transport means, is inserted through the hole 50 and attached to the hole 28 in the plate 20 and in the bottom of the cupboard 311 with an attachment plate 57 for precise adjustment to the banknote store 41.

In order to satisfy differing demands on suitable positioning of the apparatus, and to compensate for differences in street levels and floor levels within the bank etc., the part cabinet 11 is suitably formed with a rectangular opening 13 which enables the part cabinet to be placed in various directions with the keyboards etc. still facing in the right direction for the customers wishng to use the apparatus.

Figure 6:
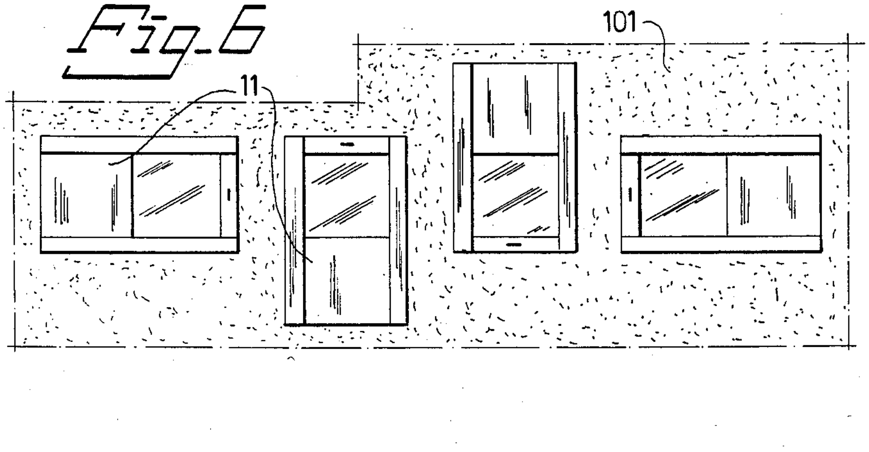
FIG. 6 illustrates a number of different positions in which the said one part cabinet can be placed.

FIG. 6 illustrates four different positions in which the part cabinet 11 can be mounted to a wall 101. As will be understood, the co-action between the means in part cabinet 11 and part cabinet 31 is the same in all cases. It is conceivable that a much smaller outer part cabinet 11 would be desirable. In this case, the transparent cover sheet 12 can be guided to a position in which it protrudes outside the part cabinet 11 when moved to one side, thereby enabling the size of the part cabinet to be approximately halved, compared with the embodiment previously illustrated and described. Such a modification is illustrated in FIG. 7.

FIG. 8 illustrates one embodiment of the transport means 25. In accordance with the invention, the transport means 25 shall be capable of being adjusted to the distance between the two part cabinets 11,31. This adjustment possibility is, in accordance with the invention, of relatively great importance in order that the apparatus can be installed without requiring large ranges of components particularly manufactured to suit differing wall thicknesses to be kept in stock and taken therefrom to suit individual installations. This possibility of adjusting the transport means is also important from another aspect. For example the standard thickness of a wall is, for example, 200 mm. In reality, however, the wall may have a thickness of, for example, 206 mm. Consequently, if a transport means 25 is designed to suit a standard wall thickness, this difference of 5 mm may make it difficult to adapt the transport means to the part cabinets or to a part cabinet, and render it necessary to lengthen the transport means, normally by re-building it. Problems of this nature do not occur with the adjustable transport means according to the invention.

The embodiment of the transport means 25, illustrated in FIG. 8 includes a U-shaped rail 80, which can be extended in a track arranged in the undersurface of a plate 81. On the outer end of the rail 80 there are arranged two drive rollers 82,83, which are journalled for free rotation on mutually parallel, vertical shafts 84,85 fixedly mounted on the rail 80. The drive roller 82 is coupled to a drive motor 86, and the drive roller 83 is coupled to a drive motor 87. These drive rollers 82,83 face towards the store 44 in the part cabinet 31 and seize the banknotes etc. dispensed from the store.

Mounted for free rotation on shafts 88,89 on the plate 81 are outfeed rollers 90,91, which are arranged to feed banknotes etc. to the customer receipt opening 18. In the illustrated embodiment, two freely rotatable pressure rollers 92,93 are arranged adjacent the two outfeed rollers 88 and 89. Arranged on the end of plate 81 remote from the outfeed rollers 88,89 is a first pair of guide rollers 94 and 95, which are freely rotatable on shafts fixedly mounted on the plate 81.

Two tension rollers 96, 97 are rotatably mounted on shafts, for example the shaft 98. The shaft 98, and the corresponding shaft (not shown) carrying the roller 97 are slidably arranged in a respetive slot 99 which extend through the plate 81. The slots of the illustrated embodiment extend longitudinally of the plate 81, although, as will be understood, the slots may also extend transversely. A first endless conveyor belt 801 extends around the rollers 82,97,95 and 91, while a second endless conveyor belt 802 extends around the rollers 83,96,94 and 90. The cylinder surfaces of the drive rollers 82 and 83 and the cylinder surfaces of the outfeed rollers 90,91 lie closely adjacent one another. Consequently, the mutually facing belt parts of the two belts 801 and 802 will be in contact with one another and between them firmly hold a banknote, etc. and transport the same from the drive rollers 82,83 to the outfeed rollers 90,91.

When installing the transport means 25 in the hole 50 (FIG. 5) or in a tube 40, when a tube is used, there is first loosened a stop screw 803 which is screwed into the plate 81 and the inner end of which, when the screw is screwed fully home, lies against the rail 80 and locks the rail 80 in its position in the plate 81. When the stop screw 803 is unscrewed sufficiently, the rail 80 can be moved along the groove in the underside of the plate 81 (the illustrated transport means is shown in its substantially totally extended state), thereby readily to adjust the transport means to the prevailing wall thickness and the distance between the two part cabinets 11 and 31. It is assumed here that the rail 80 is pushed some distance into the plate 81, to obtain the correct length of the transport means 26. The transport means 25 is then withdrawn from the hole 50, and the stop screw 803 tightened, to lock the rail 80 and the plate 81 together. This adjustment means that the distance between the outfeed rollers 90,91 and the drive rollers 82,83 will be shorter, and that consequently tension will be lost in the two belts 801 and 802. As beforementioned, the two tension rollers 96,97 are mounted on shafts 98 which can be moved along respective slots 99. Arranged on the bottom of each of said shafts is a fixed pressure plate 804 which although in the illustrated case is shown to be lowered from the plate 81 actually lies against the underside of said plate 81. That part of the shaft 98 located between the pressure plate 804 and the underside of the tension rollers 96,97 is screw-threaded. Arranged on respective shafts 98 above the plate 81 is a screw-threaded nut 805, which, when tightened, causes the plate 81 to be clamped firmly between the pressure plate 804 and the nut 805, thereby to hold the shaft 98 firmly in its selected position in the slot 99. Thus, in order to tension the endless belt 802, the nut 805 is slackened and the tension roller 96 with shaft 98 is moved towards the outfeed rollers 90,91. When the belt has been tensioned to the extent desired, the nut 805 is re-tightened and the procedure repeated with respect to the other belt 801. If desired, the two illustrated rollers 92,93 can be omitted, since they are not required for tensioning the belts. In the case of extremely slack belts, however, these rollers function in an oscillation-damping mode.

As will be understood, the illustrated embodiment enables the length of the transport means to be adjusted to exact requirements to compensate for any deviations, both large and small, in wall thickness.

As will also be understood, the illustrated embodiment of the transport means is solely meant to illustrate the transport means in principle, and that the illustrated transport means can be modified within wide limits.

The part cabinet 11 illustrated in FIG. 1 can, in turn, be divided into two split cabinets, of which one split cabinet is substantially designed in the manner illustrated in FIG. 1, but has no customer receipt opening 18, while the other (remaining) split cabinet includes only one receipt opening (optionally the infeed opening) 18. The second split cabinet can therefore have a cross-sectional area which is only slightly larger than the cross-sectional area of the transport means 25 or the tube 40, as seen perpendicularly to the longitudinal direction of the transport means (the tube) through the wall 101. The cross-sectional area of the transport means 25 is, in this case, still substantially smaller than the cross-sectional area of the other part cabinet 31.

In the description of the apparatus made with reference to FIG. 1, it has been described, inter alia, how the transparent sheet 12 is moved to the left, to expose the members in the large opening 13, namely by inserting a valid bankers card into the opening 14. In an alternative mode, the opening 14 in the edge portion of the part cabinet can be omitted and a corresponding slot-like opening arranged in the transport sheet 12, opposite the customers receipt opening 18. The dispensing procedure (or depositing procedure) can then be as follows: The customer inserts the bankers card through the opening in the sheet 12 and into the dispensing (depositing) opening 18, the card is sensed and, if it is found to be valid, is withdrawn into the apparatus. The transparent sheet is then automatically moved to the left, whereafter the customer makes his or her transaction and subsequently the bankers card is returned, together with the ordered number of banknotes and/or a receipt receipting the transaction made. In this embodiment, the narrow opening in the transparent sheet guides the card correctly into the larger opening 18.

When the part cabinet 11 is divided into two split cabinets, of which one merely contains the opening 18, there is suitably arranged immediately inwardly of the opening in the cabinet a mechanism in the form of a pivotable unit which will exhibit, prior to a withdrawal from the apparatus (or prior to a deposit being made) a narrow opening which is solely intended for a bankers card, and which unit, after the bankers card has been sensed and found to be valid, is rotated through, for example, 90° to present an opening of the same width and height as the opening 18. When the customer transaction has been completed, the rotatable unit is returned to its starting position, with the narrow opening accessible from outside the cabinet. The firstmentioned rotation can also take place in this case subsequent to the bankers card either having been withdrawn by the customer or drawn into the apparatus, depending upon the procedure selected for the functioning of the apparatus.

In the aforegoing, the invention has been described in detail with reference to a dispensing apparatus for valuable papers. As will be understood, the invention can also be used with an apparatus for depositing valuable papers in a deposit chamber located within the apparatus, or with an apparatus for both dispensing and depositing valuable papers, within the scope of the invention as defined in the following claims.

I claim:

1. An apparatus for dispensing valuable papers such as banknotes, cheques etc. from a store to a customer receipt opening and/or for depositing such valuable papers to a safety deposit chamber located within the apparatus, said apparatus comprising a cabinet for housing various apparatus components, such as said store and/or said safety deposit chamber, transport means for transporting valuable papers from the store to the customer receipt opening and/or for transporting such papers to the safety deposit chamber, keyboards and electronic unit for controlling the dispensing and/or depositing procedure, and an energy supply unit for supplying electrical energy to the electronic unit, the transport means etc., in which apparatus the cabinet comprises two part cabinets (11, 31) and in which part of said transport means (25) is arranged between said part cabinets (11, 31), said part having a cross-sectional surface whose area is substantially smaller than the area of the cross-sectional surface of at least one part cabinet (31), characterized in that said part of said transport means (25) is arranged to be positioned substantially horizontally, and in that the length of said transport means can be adjusted longitudinally to the distance between the part cabinets (11, 31).

2. An apparatus according to claim 1, in which said part of said transport means (25) has a cross-sectional surface whose area is substantially smaller than the area of the cross-sectional surface of each of the part cabinets (11 and 31), characterized by a plate (20) whose cross-sectional surface is equally as large as the cross-sectional surface of one part cabinet (11), said plate being arranged for attachment of the part cabinet (11).

3. An apparatus according to claim 2, characterized in that arranged between said part cabinets (11, 31) is a longitudinally adjustable tube (40), the cross-sectional surface of which has an area of the same magnitude as the area of the cross-sectional surface of said part of said transport means (25), which extends through the tube (40) up to the end of the tube facing the plate (20).

4. An apparatus according to claim 2 or claim 3, characterized in that said one part cabinet (11), which houses the keyboard (15), the customer receipt opening (18) and a card reader (16), has a large rectangular opening (13) arranged to be covered by a movably arranged sheet (12) of transparent material, and a small, slot-like opening (14) which is located adjacent the large opening and which is intended for the insertion of a bankers card when activating lateral movement of the sheet (12) to expose the keyboard (15), the card reader (16) and the customer receipt opening (18).

5. An apparatus according to claim 2 or claim 3, characterized in that said part cabinet (11), which houses the keyboard (15), the customer receipt opening (18) and a card reader (16) has a large rectangular opening (13), which is arranged to be closed by a movably arranged sheet (12) of transparent material, and in that arranged in said sheet (12), opposite the customer receipt opening (18), is a slot-like opening, intended for the insertion of a bankers card.

6. An apparatus according to claim 2 or claim 3, characterized in that the one part cabinet is divided into two split cabinets, of which the one includes solely the customer receipt opening (18); and in that arranged inwardly of the customer receipt opening (18) is a mechanism in a form of a rotatable unit, which in one position presents a narrow opening, which is intended solely for a bankers card, opposite the customer receipt opening (18), and another position in which it presents an opening opposite the customer receipt opening (18) of the same width and height as the height and width of said customer receipt opening.

* * * * *